No. 701,473. Patented June 3, 1902.
L. B. DONKERS.
MACHINE FOR KNEADING AND WASHING MARGARIN OR OTHER SIMILAR SUBSTANCES.
(Application filed Sept. 4, 1901.)
(No Model.) 2 Sheets—Sheet 1.
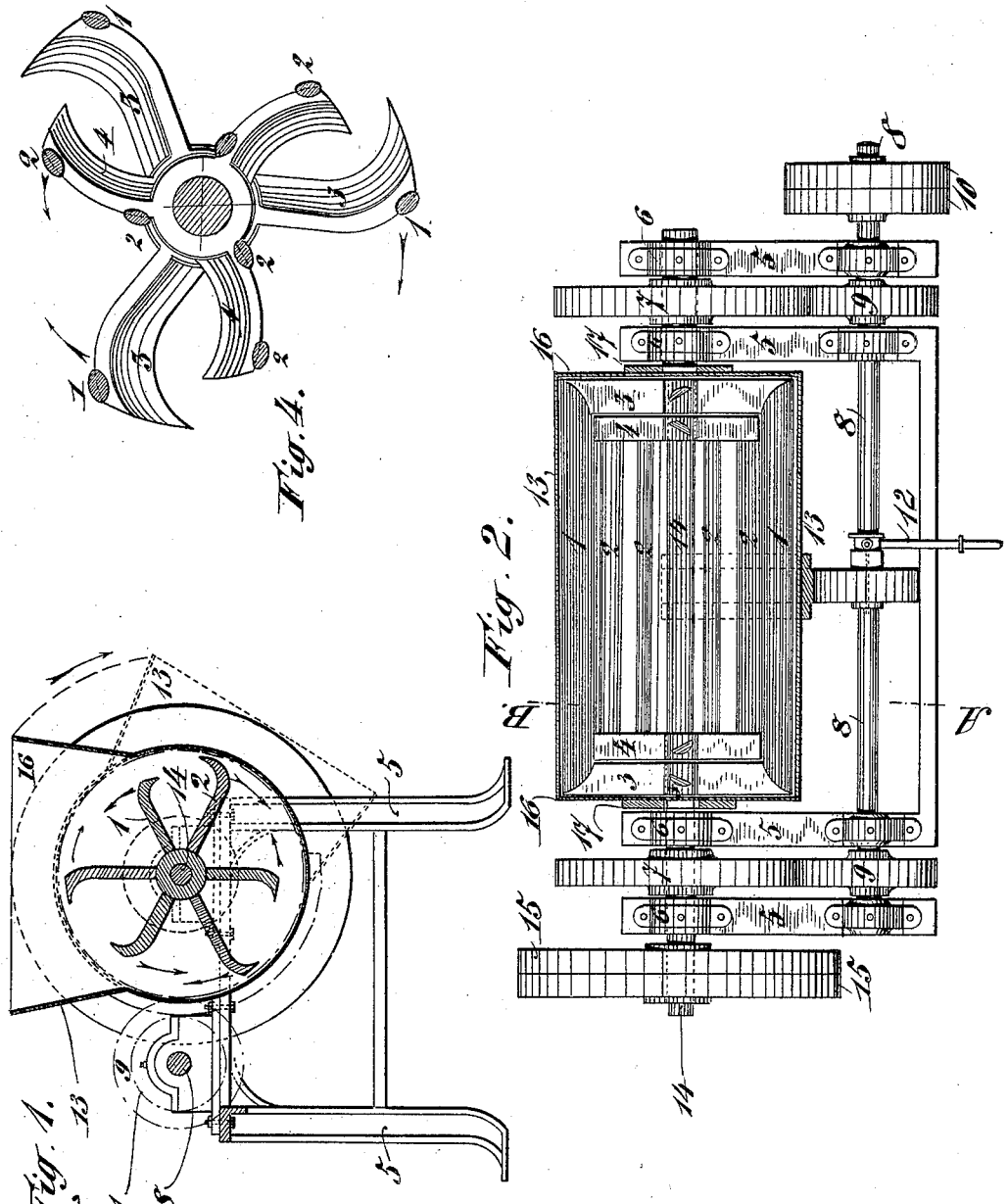
Witnesses.
Wm D Bell
Robert J. Pollitt
Inventor,
Louis Baptiste Donkers,
by Gartner & Seward,
Attorneys.

No. 701,473. Patented June 3, 1902.
L. B. DONKERS.
MACHINE FOR KNEADING AND WASHING MARGARIN OR OTHER SIMILAR SUBSTANCES.
(Application filed Sept. 4, 1901.)
(No Model.) 2 Sheets—Sheet 2.
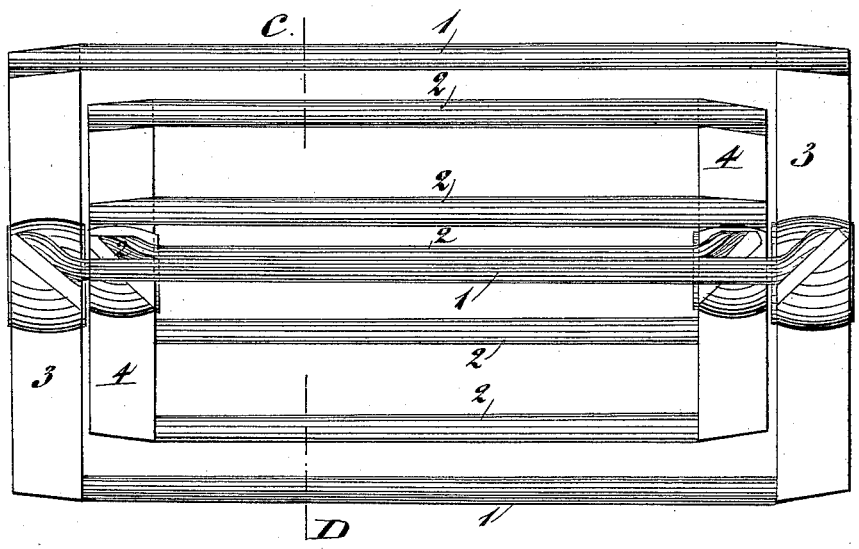
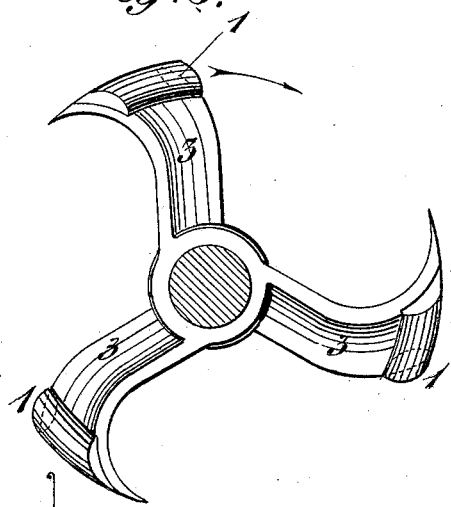
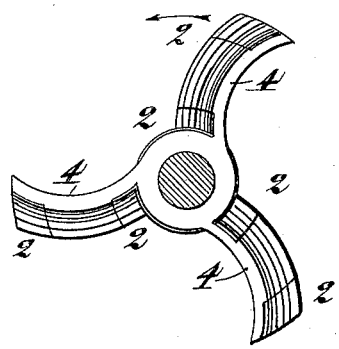

UNITED STATES PATENT OFFICE.

LOUIS BAPTISTE DONKERS, OF ANTWERP, BELGIUM.

MACHINE FOR KNEADING AND WASHING MARGARIN OR OTHER SIMILAR SUBSTANCES.

SPECIFICATION forming part of Letters Patent No. 701,473, dated June 3, 1902.

Application filed September 4, 1901. Serial No. 74,263. (No model.)

*To all whom it may concern:*

Be it known that I, LOUIS BAPTISTE DONKERS, a subject of the King of Belgium, residing at Antwerp, Belgium, have invented a new and useful Machine for Kneading and Washing Margarin or other Similar Substances; and I do hereby declare the following to be a full, clear, and exact description of the same.

This invention relates to machines for kneading and washing butter, termed "mechanical malaxating - machines," and employed for treating margarine and other similar products.

The principal part of the invention is a mixing contrivance composed of two rotary cages or drums of similar construction arranged one within the other and rotating in opposite directions for the purpose of obtaining a perfect and consistent mixture in the form of an ingot without damaging the material. In order to secure this result, each of the cages or drums is composed of longitudinal bars or rods of oval section fixed at their ends to arms having the form of screw-blades. The object of these arms is to throw the material constantly toward the middle of the vat which contains it in order that it may be thoroughly triturated by the longitudinal bars.

In the accompanying drawings one form of the machine is illustrated by way of example.

Figure 1 is a transverse vertical section along the line A B in Fig. 2. Fig. 2 is a plan. Fig. 3 is a longitudinal elevation of the rotary cages or drums. Fig. 4 is a transverse section along the line C D in Fig. 3; and Figs. 5 and 6, respectively, represent one of the screw - blade contrivances of the outside basket or drum and one of the inside baskets or drums in front view.

The same parts are numbered to correspond in all the figures of the drawings.

The machine consists, substantially, of a circular vessel 13, in which two cages or drums 1 3 and 2 4 rotate in opposite directions, the latter drum being arranged inside the former. The outer drum (see Figs. 2 to 5) is formed of oval metal bars 1, placed longitudinally and fixed at their ends to the blades 3 of two screw - blade contrivances, each with three arms arranged at the ends of the vessel. The inside drum is constructed in the same manner as the foregoing; but the screw-blades 4, which are arranged inside the screw-blades 3 and at a very slight distance therefrom, are smaller than the latter, so as to be capable of turning inside the bars 1 1. Further, two or three bars 1 2 may be fixed on each blade 4 of the screw - blade contrivances. The blades or arms of the screw-blade contrivances 4 are inclined in a contrary direction to the blades 3 in relation to the longitudinal axis of the machine, so as to produce the same effect as these latter, although turning in the contrary direction.

The hubs of the screw-blade contrivances 3 3 are provided in front with two shaft ends running through the heads 17 17 and rotating in the bearings 6 6, arranged on the frame of the machine. (See Fig. 2.) These shafts carry the tooth-wheels 7 7, which are actuated by the corresponding pinions 9 9, fixed on the parallel shaft 8, and this latter is operated by means of the pulleys 10 10 or in any other suitable manner. The shaft of the right-hand screw-blade contrivance 3 is partially perforated and that of the left-hand contrivance wholly perforated, so as to allow of the passage of the shaft 14, which carries the screw-blade contrivances 4 of the inside drum 2 4. The shaft 14 and the drum 2 4 are rotated by means of the pulleys 15 or in any other suitable manner.

On the shaft 8 a tooth-pinion 11 is arranged, which can be stopped or set in motion by means of the coupling-lever 12 and engages with a rack fixed on the outside of the vessel 13. When the treatment of the material is finished, the pinion 11 is rotated, and in acting on the rack reverses the vessel 13, as shown in dotted lines in Fig. 1, so as to allow the material to be removed. In order to effect this reversing of the vessel 13, the latter is caused to turn on the bearings 6 by means of the heads 17, fixed externally to the sides 10 of the vessel.

In certain cases, according to the quantity of material to be treated, one drum only may be employed for small machines, or, on the contrary, several screw-blade contrivances 4 may be arranged on the shaft 14 for large machines.

The rotation of the drums in this machine may be effected by means of any suitable mechanical contrivance without thereby departing from the principle of the invention. The special form of the drums and their rotation in opposite directions enable a better mixed and more consistent material to be obtained than with other similar machines. Moreover, the material is not damaged and takes the form of an ingot, which can be easily removed from the vessel by reversing the latter. This new machine has also the advantage of not necessitating the employment of counterweights and of including only one vessel, (vat or tank.)

Having now particularly described and ascertained the nature of my said invention and in what manner the same is to be performed, I declare that what I claim is—

The combination of a substantially cylindrical receptacle having an opening in its side wall, a supporting-frame, said receptacle being arranged to turn in said frame, a shaft arranged parallel with said receptacle, reversely-rotatable cages arranged in said receptacle, means for rotating one of said cages, gearing connecting said shaft with the other cage, and disconnective means for turning said receptacle in the frame, a portion of said means being carried by said shaft, substantially as described.

In testimony whereof I have signed this specification in the presence of two subscribing witnesses.

LOUIS BAPTISTE DONKERS.

Witnesses:
 FRANCIS E. VOUILLON,
 H. CHRISTIAENSEN.